(12) United States Patent
Cleaver et al.

(10) Patent No.: US 11,464,168 B2
(45) Date of Patent: Oct. 11, 2022

(54) AUTOMATED VEGETATION REMOVAL

(71) Applicant: KYNDRYL, INC., New York, NY (US)

(72) Inventors: James D. Cleaver, Grose Wold (AU); Christopher J. De Vaney, Griffith (AU); Louise A. McGuire, Beaumont Hills (AU); Michael J. McGuire, Beaumont Hills (AU)

(73) Assignee: KYNDRYL, INC., New York, NY (US)

( * ) Notice: Subject to any disclaimer, the term of this patent is extended or adjusted under 35 U.S.C. 154(b) by 784 days.

(21) Appl. No.: 15/291,649

(22) Filed: Oct. 12, 2016

(65) Prior Publication Data

US 2018/0098499 A1   Apr. 12, 2018

(51) Int. Cl.
*A01D 91/00*   (2006.01)
*A01B 69/04*   (2006.01)
(Continued)

(52) U.S. Cl.
CPC ............ *A01D 91/00* (2013.01); *A01B 69/008* (2013.01); *A01M 21/043* (2013.01); *G01C 21/20* (2013.01);
(Continued)

(58) Field of Classification Search
CPC ...... A01D 91/00; A01D 34/008; A01D 42/00; A01B 69/008; A01M 21/043;
(Continued)

(56) References Cited

U.S. PATENT DOCUMENTS 8,407,157 B2 * 3/2013 Anderson ............ A01B 69/008
701/50
8,620,510 B1 * 12/2013 Meuth .................. G06Q 10/063
701/26

(Continued)

FOREIGN PATENT DOCUMENTS

CN   103869821 A  *  6/2014

OTHER PUBLICATIONS

Anderson, Chris; Agricultural drones for weed control; DIY Drones; Retrieved from the Internet Jul. 26, 2016; URL: http://diydrones.com/profiles/blogs/agricultural-drones-for-weed-control; 7 pages.

*Primary Examiner* — Ig T An
(74) *Attorney, Agent, or Firm* — Erik Swanson; Hunter E. Webb; Keohane & D'Alessandro, PLLC

(57) ABSTRACT

A method and system for automatically removing undesirable vegetation is provided. The method includes receiving by a first vehicle, data describing a specified geographical area for scanning. The specified geographical area is divided into a plurality of sectors and a second vehicle is directed to a first sector of the plurality of sectors. First geographical coordinates associated with areas of undesirable vegetation growth located within the first sector are receiving from the second vehicle and an optimal travel path from a current location of the first vehicle to the areas of undesirable vegetation growth located within first sector are determined based on analysis of the first geographical coordinates. The first vehicle is directed to the areas of undesirable vegetation growth via the optimal travel path and a process for eliminating the areas of undesirable vegetation growth is executed.

9 Claims, 4 Drawing Sheets

(51) Int. Cl.
  *G01C 21/20* (2006.01)
  *A01M 21/04* (2006.01)
  *G05D 1/02* (2020.01)

(52) U.S. Cl.
  CPC ......... *G05D 1/0217* (2013.01); *G05D 1/0282* (2013.01); *G05D 2201/0201* (2013.01)

(58) Field of Classification Search
  CPC .... G01C 21/20; G05D 1/0217; G05D 1/0282; G05D 2201/0201; G05D 1/0278; G05D 1/0274; G05D 1/0265; G05D 2201/0208; G05D 2201/0203; A47L 9/00
  See application file for complete search history.

(56) References Cited

U.S. PATENT DOCUMENTS

| | | |
|---|---|---|
| 8,731,836 B2 | 5/2014 | Lindores et al. |
| 9,265,187 B2 | 2/2016 | Cavender-Bares et al. |
| 9,421,869 B1* | 8/2016 | Ananthanarayanan .. B64D 5/00 |
| 2012/0042563 A1* | 2/2012 | Anderson ................ G06N 5/04 43/132.1 |
| 2014/0121881 A1* | 5/2014 | Diazdelcastillo ...... A01D 42/00 180/9.1 |
| 2014/0303814 A1* | 10/2014 | Burema ................. A01C 21/00 901/1 |
| 2016/0018224 A1* | 1/2016 | Isler .................... G05D 1/0274 701/25 |
| 2016/0157414 A1* | 6/2016 | Ackerman ........... G05D 1/0225 701/25 |
| 2016/0205872 A1* | 7/2016 | Chan .................... G05D 1/0094 |
| 2017/0021941 A1* | 1/2017 | Fisher ................... B64C 39/024 |
| 2017/0031365 A1* | 2/2017 | Sugumaran .......... G05D 1/0246 |
| 2017/0075354 A1* | 3/2017 | Putkonen ............ A01G 23/006 |
| 2020/0020093 A1* | 1/2020 | Frei ........................... G06T 7/60 |

\* cited by examiner

AUTOMATED VEGETATION REMOVAL

FIELD

The present invention relates generally to a method for implementing a vehicle based automated vegetation removal process and in particular to a method and associated system for dividing an area into sectors and directing a vehicle to sectors comprising undesirable vegetation for removal.

BACKGROUND

Implementing weed control processes typically includes an inaccurate process with little flexibility. Weed control herbicides process may enhance negative environmental impacts and typically involve an unreliable process that may be time consuming and require a large amount of resources. Accordingly, there exists a need in the art to overcome at least some of the deficiencies and limitations described herein above.

SUMMARY

A first aspect of the invention provides an automated vegetation removal method comprising: receiving, by a processor of a first vehicle, data describing a specified geographical area for scanning; dividing, by the processor, the specified geographical area into a plurality of sectors; directing, by the processor, a second vehicle to a first sector of the plurality of sectors; receiving, by the processor from the second vehicle, first geographical coordinates associated with areas of undesirable vegetation growth located within the first sector; determining, by the processor based on analysis of the first geographical coordinates, an optimal travel path from a current location of the first vehicle to the areas of undesirable vegetation growth located within the first sector; directing, by the processor, the first vehicle to the areas of undesirable vegetation growth via the optimal travel path; executing upon arrival of the first vehicle to the areas of undesirable vegetation growth, by the processor via the first vehicle, a process for eliminating the areas of undesirable vegetation growth.

A second aspect of the invention provides a computer program product, comprising a computer readable hardware storage device storing a computer readable program code, the computer readable program code comprising an algorithm that when executed by a processor of a first vehicle implements automated vegetation removal method, the method comprising: receiving, by the processor, data describing a specified geographical area for scanning; dividing, by the processor, the specified geographical area into a plurality of sectors; directing, by the processor, a second vehicle to a first sector of the plurality of sectors; receiving, by the processor from the second vehicle, first geographical coordinates associated with areas of undesirable vegetation growth located within the first sector; determining, by the processor based on analysis of the first geographical coordinates, an optimal travel path from a current location of the first vehicle to the areas of undesirable vegetation growth located within the first sector; directing, by the processor, the first vehicle to the areas of undesirable vegetation growth via the optimal travel path; executing upon arrival of the first vehicle to the areas of undesirable vegetation growth, by the processor via the first vehicle, a process for eliminating the areas of undesirable vegetation growth.

A third aspect of the invention provides a first vehicle comprising a processor coupled to a computer-readable memory unit, the memory unit comprising instructions that when executed by the processor executes automated vegetation removal method comprising: receiving, by the processor, data describing a specified geographical area for scanning; dividing, by the processor, the specified geographical area into a plurality of sectors; directing, by the processor, a second vehicle to a first sector of the plurality of sectors; receiving, by the processor from the second vehicle, first geographical coordinates associated with areas of undesirable vegetation growth located within the first sector; determining, by the processor based on analysis of the first geographical coordinates, an optimal travel path from a current location of the first vehicle to the areas of undesirable vegetation growth located within the first sector; directing, by the processor, the first vehicle to the areas of undesirable vegetation growth via the optimal travel path; executing upon arrival of the first vehicle to the areas of undesirable vegetation growth, by the processor via the first vehicle, a process for eliminating the areas of undesirable vegetation growth.

The present invention advantageously provides a simple method and associated system capable of implementing weed control processes.

DETAILED DESCRIPTION

Figure 1:
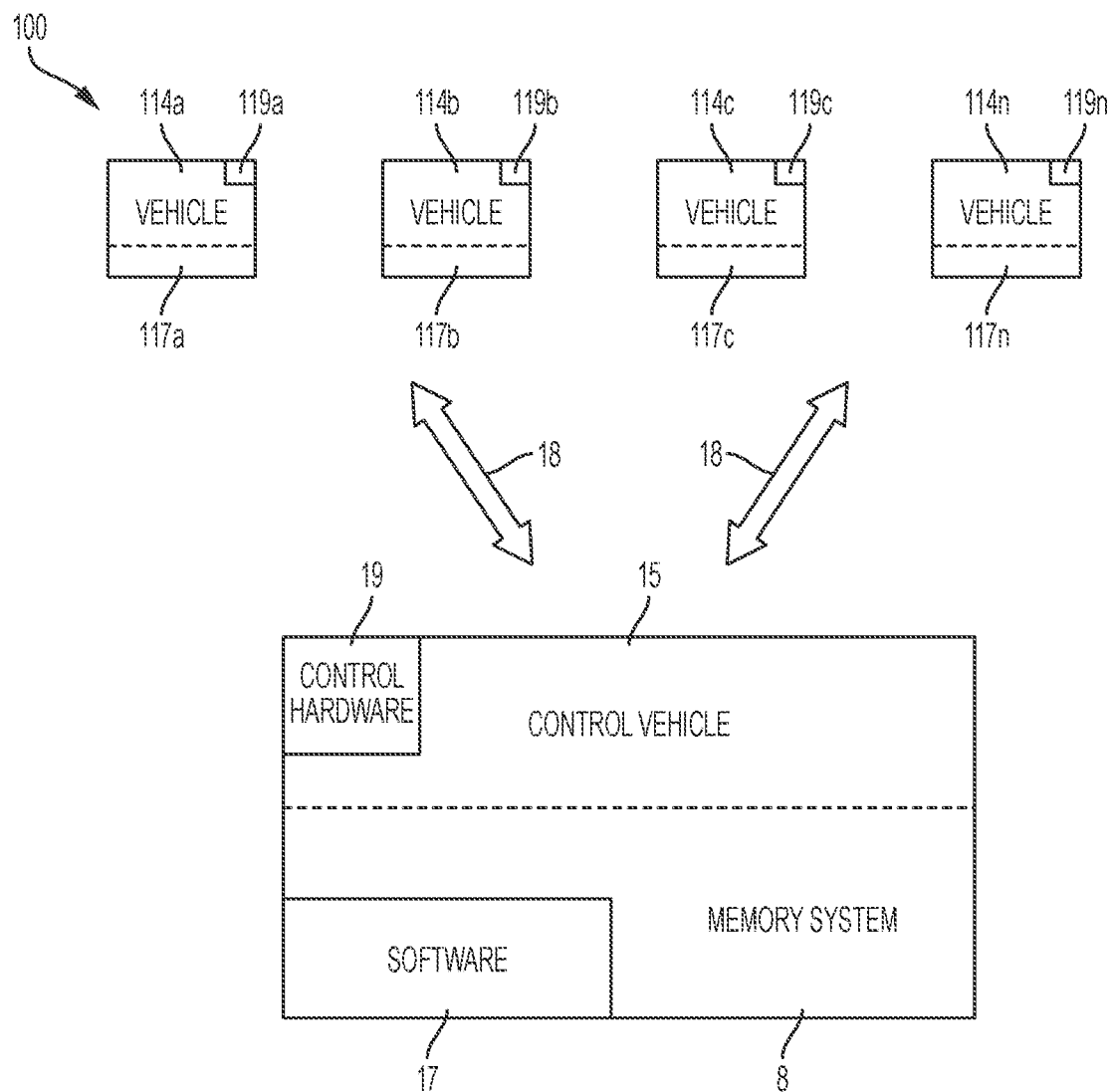
FIG. 1 illustrates a system for enabling a control vehicle to automatically divide a geographical area into sectors and direct an undesirable vegetation removal process, in accordance with embodiments of the present invention.

FIG. 1 illustrates a system 100 for enabling control vehicle 15 to automatically divide a geographical area into sectors and direct an undesirable vegetation removal process, in accordance with embodiments of the present invention. System 100 enables a process for automated control of undesirable vegetation (e.g., weeds) via usage of aerial and land/terrestrial vehicles by: identifying and locating undesirable vegetation (via vehicles 114a . . . 114n) and automatically directing vehicle 15 to a target location (comprising undesirable vegetation) for removal of the undesirable vegetation. Additionally, vehicles 114a . . . 114n may return to a location of vehicle 15 for recharging (e.g., batteries) via vehicle 15.

System 100 of FIG. 1 includes a control vehicle 15 in communication with vehicles 114a . . . 114n (comprising video devices 117a . . . 117n such as, inter alia, a video camera and control hardware 119a . . . 119n comprising sensor devices such as, inter alia, an optical sensor, a GPS sensor, etc.) via a wireless network 118. Vehicles 114a . . .

114*n* (i.e., control hardware 119*a* . . . 119*n* internal to vehicles 114*a* . . . 114*n*) and control vehicle 15 (i.e., control hardware 19) each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 114*a* . . . 114*n* (i.e., control hardware 119*a* . . . 119*n* internal to vehicles 114*a* . . . 114*n* vehicles) and control vehicle 15 (i.e., control hardware 19) may each comprise a specialized hardware device comprising specialized (non-generic) hardware and circuitry (i.e., specialized discrete non-generic analog, digital, and logic based circuitry) for executing a process described with respect to FIGS. 1-4. The specialized discrete non-generic analog, digital, and logic based circuitry may include proprietary specially designed components (e.g., a specialized integrated circuit, such as for example an Application Specific Integrated Circuit (ASIC) designed for only implementing an automated process for automatically dividing a geographical area into sectors and directing an undesirable vegetation removal process. Control vehicle 15 includes a memory system 8, software 17, and control hardware 19 (all sensors and associated control hardware for enabling software 17 to execute a process for automatically dividing a geographical area into sectors and directing an undesirable vegetation removal process). Control hardware 19 may include sensors. Sensors may include, inter alia, GPS sensors, video recording devices, optical sensors, weight sensors, etc. Additionally, control hardware 19 may include a battery charging station for recharging batteries of vehicles 114*a* . . . 114*n*. The memory system 8 may include a single memory system. Alternatively, the memory system may include a plurality of memory systems. Each of vehicles 114*a* . . . 114*n* and control vehicle 15 may comprise any vehicle that does not require a human operator to be located within the vehicles 114*a* . . . 114*n* or control vehicle 15 such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicles 114*a* . . . 114*n* or control vehicle 15 to know it's location and self-determine a route to an audience member), a pre-programmed vehicle, etc. Alternatively, vehicles 114*a* . . . 114*n* and control vehicle 15 may comprise any type of vehicle that includes a human operator located within the vehicle (e.g., an aircraft, an automobile, a boat or ship, a train, etc.). Vehicles 114*a* . . . 114*n* and control vehicle 15 may include, inter alia, an aerial vehicle, a land based vehicle, a marine (water) based vehicle, etc.

The following implementation example illustrates a vegetation removal process executed by vehicles 114*a* . . . 114*n* (i.e., an aerial vehicle) and control vehicle 15 (a land based vehicle) thereby enabling vehicles 114*a* . . . 114*n* to determine locations for the undesirable vegetation and control vehicle 15 to perform a removal process as follows:

Control vehicle 15 determines a target geographical area for scanning for undesirable vegetation and divides the target geographical area into sectors (i.e., as illustrated with respect to FIG. 2, infra) corresponding to flight ranges of vehicles 114*a* . . . 114*n*. Vehicles 114*a* . . . 114*n* are directed to associated sectors to perform an automated discovery patrol and scan associated sectors for undesirable vegetation. Coordinates for the undesirable vegetation in each sector (retrieved by vehicles 114*a* . . . 114*n*) are transmitted back to control vehicle 15 and in response vehicles 114*a* . . . 114*n* are directed to control vehicle 15 for a battery recharging process. Control vehicle 15 determines (based on the received coordinates) an optimal travel path (e.g., a shortest travel path) to each area of undesirable vegetation in each sector and subsequently travels, via the optimal travel path, to each area of undesirable vegetation for removal. The removal process is executed by control vehicle 15 and may include spraying a chemical substance (e.g., a herbicide) over the areas of undesirable vegetation growth to eliminate the areas of undesirable vegetation growth. Alternatively, the removal process may include mechanically removing (via control vehicle 15) the areas of undesirable vegetation growth. For example, control vehicle 15 may enable a soil turning apparatus (a rake, a shovel, a tiller, etc.) for removal of the undesirable vegetation growth.

Figure 2:
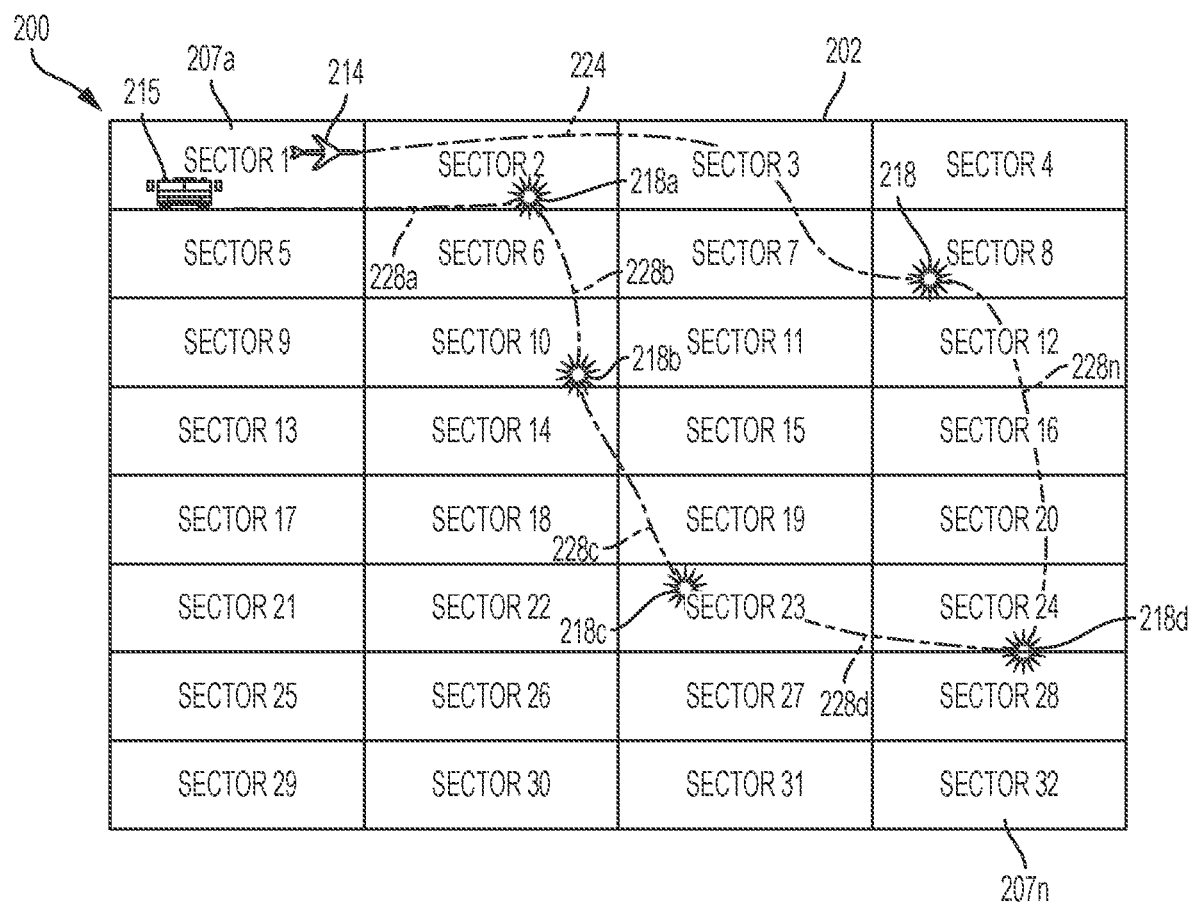
FIG. 2 illustrates a system comprising vehicles enabled to automatically divide a geographical area into sectors and direct an undesirable vegetation removal process, in accordance with embodiments of the present invention.

FIG. 2 illustrates a system 200 comprising a vehicle 214 and control vehicle 215 enabled to automatically divide a geographical area 202 into sectors 207*a* . . . 207*n* and direct an undesirable vegetation removal process, in accordance with embodiments of the present invention. Geographical area 202 comprises areas undesirable vegetation 218*a* . . . 218*n* and is divided into (virtual) sectors 207*a* . . . 207*n*. The aforementioned process described with respect to FIG. 1 enables control vehicle 215 to direct vehicle 214 (e.g., via path 224) to scan each of sectors 207*a* . . . 207*n* for undesirable vegetation (e.g., undesirable vegetation 218*a* . . . 218*n*) and transmit associated geographical coordinates (for areas of undesirable vegetation growth) back to control vehicle 215 for analysis. In response, control vehicle determines an optimal travel path (a combination of travel paths 228*a*-218*n*) to each area of undesirable vegetation (i.e., undesirable vegetation 218*a* . . . 218*n*) in each sector (of sectors 207*a* . . . 207*n*) and subsequently travels, via the optimal travel path, to each area of undesirable vegetation for removal.

Figure 3:
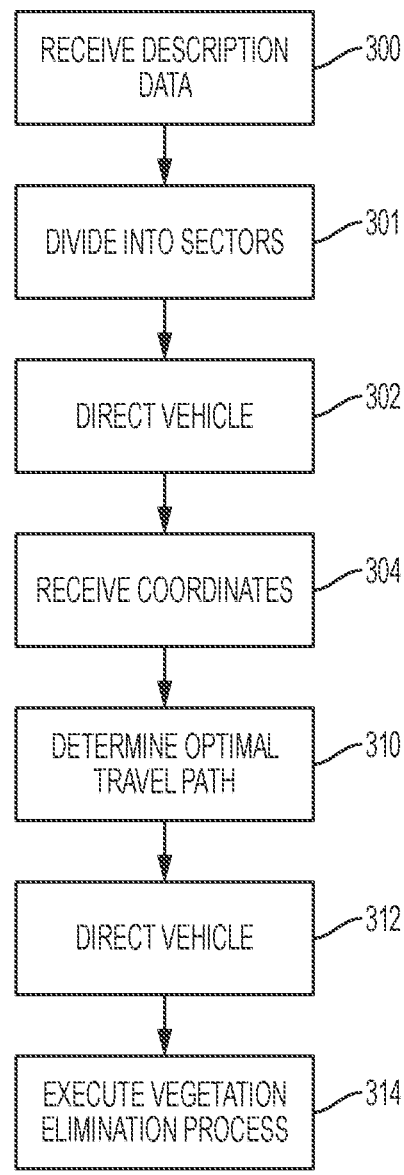
FIG. 3 illustrates an algorithm detailing a process flow enabled by the system of FIG. 1 for enabling a control vehicle to automatically divide a geographical area into sectors and direct an undesirable vegetation removal process, in accordance with embodiments of the present invention.

FIG. 3 illustrates an algorithm detailing a process flow enabled by system 100 of FIG. 1 for enabling a control vehicle to automatically divide a geographical area into sectors and direct an undesirable vegetation removal process, in accordance with embodiments of the present invention. Each of the steps in the algorithm of FIG. 3 may be enabled and executed in any order by a computer processor(s) or any type of specialized hardware executing computer code. In step 300, data (describing a specified geographical area for undesirable vegetation scanning) is received by a control vehicle (e.g., control vehicle 15 of FIG. 1). In step 301, the specified geographical area is divided into a plurality of sectors. In step 302, a scouting (aerial) vehicle is directed (by the control vehicle) to multiple sectors of the plurality of sectors. In step 304, geographical coordinates (associated with areas of undesirable vegetation (determined via a patrol and scanning process executed by the second vehicle via, e.g., a video device) growth located within the multiple sectors) are received from the second vehicle. Additionally, the second vehicle may be directed back to a current location of the first vehicle for recharging (via the first vehicle) the second vehicle. In step 310, an optimal travel path from a current location of the first vehicle to the areas of undesirable vegetation growth located within the multiple sectors is determined based on analysis of the geographical coordinates. In step 312, the first vehicle is directed to the areas of undesirable vegetation growth (in each sector) via the optimal travel path. In step 314, a process for eliminating the areas of undesirable vegetation growth is executed upon arrival of the first vehicle to the areas of undesirable vegetation growth. The elimination process is executed by the first vehicle and may include spraying a chemical substance (e.g., a herbicide) over the areas of undesirable vegetation growth to eliminate the areas of undesirable vegetation. Alternatively, the removal process may include mechanically removing (via the first vehicle) the areas of undesirable vegetation growth. For example, the first vehicle may enable a soil turning apparatus (a rake, a shovel, a tiller, etc.) for removal of the undesirable vegetation growth.

Figure 4:
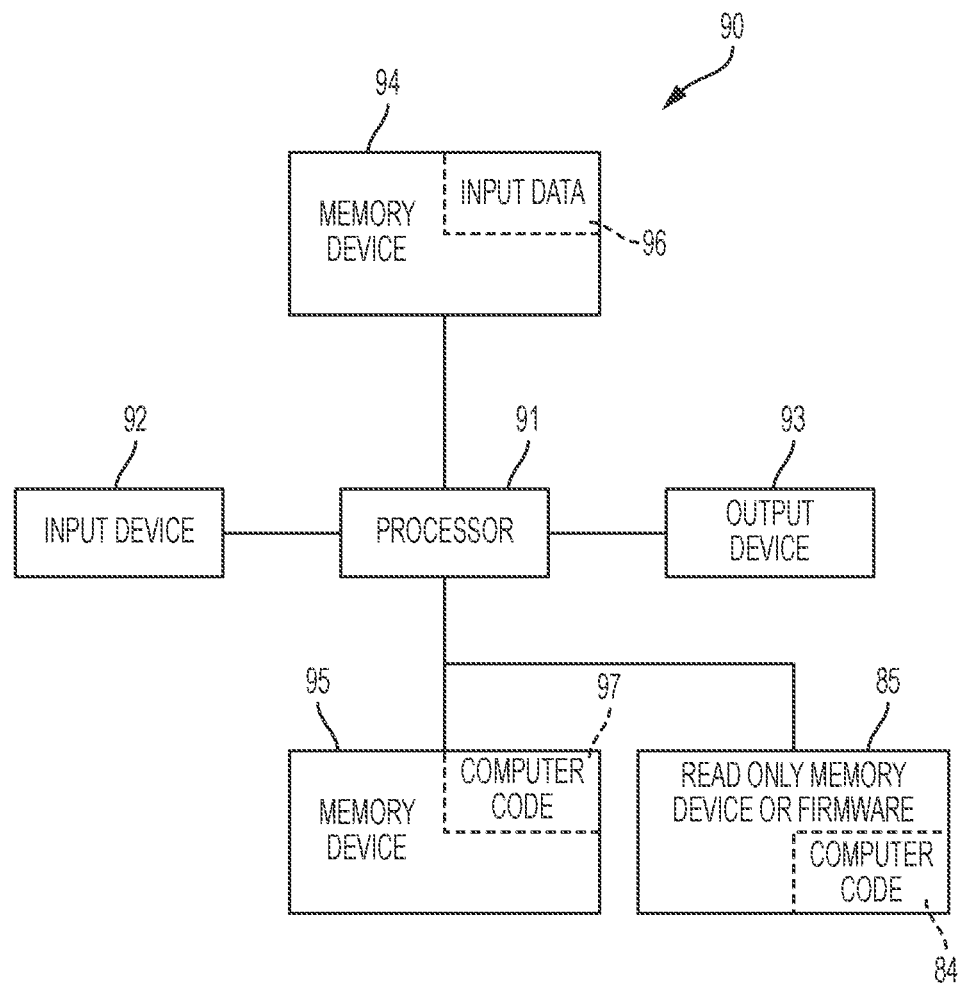
FIG. 4 illustrates a computer system used by or comprised by the system of FIG. 1 for enabling a control vehicle to automatically divide a geographical area into sectors and direct an undesirable vegetation removal process, in accordance with embodiments of the present invention.

FIG. 4 illustrates a computer system 90 (e.g., control vehicle 15 (i.e., control hardware 19 internal to control vehicle 15) and vehicles 114a . . . 114n (i.e., control hardware 119a . . . 119n internal to vehicles 114a . . . 114n) used by or comprised by the system of FIG. 1 for enabling a process for automatically dividing a geographical area into sectors and directing an undesirable vegetation removal process, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for enabling a process for automatically dividing a geographical area into sectors and directing an undesirable vegetation removal process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including an algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for automatically dividing a geographical area into sectors and directing an undesirable vegetation removal process. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for automatically dividing a geographical area into sectors and directing an undesirable vegetation removal process. In another embodiment, the invention provides a business method that performs the process steps of the invention on a subscription, advertising, and/or fee basis. That is, a service supplier, such as a Solution Integrator, could offer to enable a process for automatically dividing a geographical area into sectors and directing an undesirable vegetation removal process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties. While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated vegetation removal method comprising:
receiving, by a processor of a control vehicle, data describing a specified geographical area for scanning, wherein said control vehicle comprises an autonomous or remote controlled aerial vehicle that does not require a human operator;
directing, by said processor, a vehicle, of said plurality of vehicles, to a first sector associated with a plurality of virtual sectors of said specified geographical area, wherein said vehicle comprises an autonomous or remote controlled aerial vehicle that does not require a human operator, and wherein said vehicle comprises a video device, an optical sensor, and a GPS sensor;
directing, by said processor, an additional vehicle, of said plurality of vehicles, to said first sector, wherein said additional vehicle comprises an autonomous or remote controlled aerial vehicle that does not require a human operator, and wherein said additional vehicle comprises an additional video device, an additional optical sensor, and an additional GPS sensor;
establishing, by said processor via a wireless network, wireless communications between said control vehicle, said vehicle, and said additional vehicle;
scanning, by said processor via said video device, said additional video device, said additional optical sensor, and said optical sensor, said first sector for areas of undesirable vegetation growth;
receiving, by said processor from said vehicle via said GPS sensor and based on results of said scanning, first geographical coordinates associated with said areas of undesirable vegetation growth located within said first sector;

receiving, by said processor from said additional vehicle via said additional GPS sensor and based on results of said scanning, additional geographical coordinates associated with said areas of undesirable vegetation growth located within said first sector;

determining, by said processor based on analysis of said first geographical coordinates and said additional geographical coordinates, an optimal travel path from a current location of said control vehicle to said areas of undesirable vegetation growth located within said first sector, wherein said optimal travel path comprises a combination of multiple differing travel paths through differing portions of multiple differing virtual sectors of said plurality of virtual sectors;

directing, by said processor, said control vehicle to said areas of undesirable vegetation growth via said optimal travel path;

directing, by said processor, said control vehicle to additional areas of undesirable vegetation growth of said plurality of virtual sectors via said optimal travel path;

executing upon arrival of said control vehicle to said areas of undesirable vegetation growth and said additional areas of undesirable vegetation growth, by said processor via said control vehicle, a process for eliminating said areas of undesirable vegetation growth and said additional areas of undesirable vegetation growth, wherein said process for eliminating said areas of undesirable vegetation growth and said additional areas of undesirable vegetation growth comprises spraying, from an aerial position via said control vehicle, a chemical herbicide substance over said areas of undesirable vegetation growth and said additional areas of undesirable vegetation growth, wherein said chemical herbicide substance is adapted to eliminate said areas of undesirable vegetation growth and said additional areas of undesirable vegetation growth, wherein said process for eliminating said areas of undesirable vegetation growth and said additional areas of undesirable vegetation growth further comprises mechanically removing from an aerial position, via a rake, a shovel, and a tiller of said control vehicle, said areas of undesirable vegetation growth and said additional areas of undesirable vegetation growth, and wherein said process for eliminating said areas of undesirable vegetation growth and said additional areas of undesirable vegetation growth comprises:
first proceeding to and eliminating a first area of undesirable vegetation growth;
after said first proceeding, second proceeding to and eliminating a second area of undesirable vegetation growth;
after said second proceeding, third proceeding to and eliminating a third area of undesirable vegetation growth;

directing, by said processor after said receiving said first geographical coordinates and said additional geographical coordinates, said vehicle and said additional vehicle to said current location of said control vehicle; and recharging, by said processor via a battery charging station of said control vehicle, said vehicle and said additional vehicle.

2. The method of claim 1, wherein said areas of undesirable vegetation growth located within said first sector are determined by said vehicle during a patrol and scanning process executed by said vehicle.

3. The method of claim 1, wherein patrol and scanning process comprises scanning said first sector via a video device of said vehicle.

4. The method of claim 1, further comprising:
directing, by said processor, said vehicle to seventh sector of said plurality of virtual sectors;
receiving, by said processor from said vehicle, second geographical coordinates associated with further areas of undesirable vegetation growth located within said seventh sector, wherein said optimal travel path is determined based on said analysis of said first geographical coordinates and analysis of said second geographical coordinates, and wherein said optimal travel path further provides a path from said current location of said control vehicle to said areas of undesirable vegetation growth located within said first sector and said further areas of undesirable vegetation growth located within said seventh sector;
directing, by said processor, said control vehicle to said second areas of undesirable vegetation growth via said optimal travel path; and
executing upon arrival of said first vehicle to said further areas of undesirable vegetation growth, by said processor via said control vehicle, a process for eliminating said further areas of undesirable vegetation growth.

5. A computer program product, comprising a computer readable hardware storage device storing a computer readable program code, said computer readable program code comprising an algorithm that when executed by a processor of a control vehicle implements automated vegetation removal method, said method comprising:
receiving, by said processor, data describing a specified geographical area for scanning, wherein said control vehicle comprises an autonomous or remote controlled aerial vehicle that does not require a human operator;
directing, by said processor, a vehicle, of said plurality of vehicles, to a first sector associated with a plurality of virtual sectors of said specified geographical area, wherein said vehicle comprises an autonomous or remote controlled aerial vehicle that does not require a human operator, and wherein said vehicle comprises a video device, an optical sensor, and a GPS sensor;
directing, by said processor, an additional vehicle, of said plurality of vehicles, to said first sector, wherein said additional vehicle comprises an autonomous or remote controlled aerial vehicle that does not require a human operator, and wherein said additional vehicle comprises an additional video device, an additional optical sensor, and an additional GPS sensor;
establishing, by said processor via a wireless network, wireless communications between said control vehicle, said vehicle, and said additional vehicle;
scanning, by said processor via said video device, said additional video device, said additional optical sensor, and said optical sensor, said first sector for areas of undesirable vegetation growth;
receiving, by said processor from said vehicle via said GPS sensor and based on results of said scanning, first geographical coordinates associated with said areas of undesirable vegetation growth located within said first sector;
receiving, by said processor from said additional vehicle via said additional GPS sensor and based on results of said scanning, additional geographical coordinates associated with said areas of undesirable vegetation growth located within said first sector;

determining, by said processor based on analysis of said first geographical coordinates and said additional geographical coordinates, an optimal travel path from a current location of said control vehicle to said areas of undesirable vegetation growth located within said first sector, wherein said optimal travel path comprises a combination of multiple differing travel paths through differing portions of multiple differing virtual sectors of said plurality of virtual sectors;

directing, by said processor, said control vehicle to said areas of undesirable vegetation growth via said optimal travel path;

directing, by said processor, said control vehicle to additional areas of undesirable vegetation growth of said plurality of virtual sectors via said optimal travel path;

executing upon arrival of said control vehicle to said areas of undesirable vegetation growth and said additional areas of undesirable vegetation growth, by said processor via said control vehicle, a process for eliminating said areas of undesirable vegetation growth and said additional areas of undesirable vegetation growth, wherein said process for eliminating said areas of undesirable vegetation growth and said additional areas of undesirable vegetation growth comprises spraying, from an aerial position via said control vehicle, a chemical herbicide substance over said areas of undesirable vegetation growth and said additional areas of undesirable vegetation growth, wherein said chemical herbicide substance is adapted to eliminate said areas of undesirable vegetation growth and said additional areas of undesirable vegetation growth, wherein said process for eliminating said areas of undesirable vegetation growth and said additional areas of undesirable vegetation growth further comprises mechanically removing from an aerial position, via a rake, a shovel, and a tiller of said control vehicle, said areas of undesirable vegetation growth and said additional areas of undesirable vegetation growth, and wherein said process for eliminating said areas of undesirable vegetation growth and said additional areas of undesirable vegetation growth comprises:
  first proceeding to and eliminating a first area of undesirable vegetation growth;
  after said first proceeding, second proceeding to and eliminating a second area of undesirable vegetation growth;
  after said second proceeding, third proceeding to and eliminating a third area of undesirable vegetation growth;

directing, by said processor after said receiving said first geographical coordinates and said additional geographical coordinates, said vehicle and said additional vehicle to said current location of said control vehicle; and recharging, by said processor via a battery charging station of said control vehicle, said vehicle and said additional vehicle.

6. The computer program product of claim 5, wherein said areas of undesirable vegetation growth located within said first sector are determined by said vehicle during a patrol and scanning process executed by said vehicle.

7. The computer program product of claim 5, wherein patrol and scanning process comprises scanning said first sector via a video device of said vehicle.

8. The computer program product of claim 5, wherein said method further comprises:
  directing, by said processor, said vehicle to seventh sector of said plurality of virtual sectors;
  receiving, by said processor from said vehicle, second geographical coordinates associated with further areas of undesirable vegetation growth located within said seventh sector, wherein said optimal travel path is determined based on said analysis of said first geographical coordinates and analysis of said second geographical coordinates, and wherein said optimal travel path further provides a path from said current location of said control vehicle to said areas of undesirable vegetation growth located within said first sector and said further areas of undesirable vegetation growth located within said seventh sector;
  directing, by said processor, said control vehicle to said second areas of undesirable vegetation growth via said optimal travel path; and
  executing upon arrival of said first vehicle to said further areas of undesirable vegetation growth, by said processor via said control vehicle, a process for eliminating said further areas of undesirable vegetation growth.

9. A control vehicle comprising a processor coupled to a computer-readable memory unit, said memory unit comprising instructions that when executed by the processor executes automated vegetation removal method comprising:
  receiving, by said processor, data describing a specified geographical area for scanning, wherein said control vehicle comprises an autonomous or remote controlled aerial vehicle that does not require a human operator;
  directing, by said processor, a vehicle, of said plurality of vehicles, to a first sector associated with a plurality of virtual sectors of said specified geographical area, wherein said vehicle comprises an autonomous or remote controlled aerial vehicle that does not require a human operator, and wherein said vehicle comprises a video device, an optical sensor, and a GPS sensor;
  directing, by said processor, an additional vehicle, of said plurality of vehicles, to said first sector, wherein said additional vehicle comprises an autonomous or remote controlled aerial vehicle that does not require a human operator, and wherein said additional vehicle comprises an additional video device, an additional optical sensor, and an additional GPS sensor;
  establishing, by said processor via a wireless network, wireless communications between said control vehicle, said vehicle, and said additional vehicle;
  scanning, by said processor via said video device, said additional video device, said additional optical sensor, and said optical sensor, said first sector for areas of undesirable vegetation growth;
  receiving, by said processor from said vehicle via said GPS sensor and based on results of said scanning, first geographical coordinates associated with said areas of undesirable vegetation growth located within said first sector;
  receiving, by said processor from said additional vehicle via said additional GPS sensor and based on results of said scanning, additional geographical coordinates associated with said areas of undesirable vegetation growth located within said first sector;
  determining, by said processor based on analysis of said first geographical coordinates and said additional geographical coordinates, an optimal travel path from a current location of said control vehicle to said areas of undesirable vegetation growth located within said first sector, wherein said optimal travel path comprises a combination of multiple differing travel paths through differing portions of multiple differing virtual sectors of said plurality of virtual sectors;

directing, by said processor, said control vehicle to said areas of undesirable vegetation growth via said optimal travel path;

directing, by said processor, said control vehicle to additional areas of undesirable vegetation growth of said plurality of virtual sectors via said optimal travel path;

executing upon arrival of said control vehicle to said areas of undesirable vegetation growth and said additional areas of undesirable vegetation growth, by said processor via said control vehicle, a process for eliminating said areas of undesirable vegetation growth and said additional areas of undesirable vegetation growth, wherein said process for eliminating said areas of undesirable vegetation growth and said additional areas of undesirable vegetation growth comprises spraying, from an aerial position via said control vehicle, a chemical herbicide substance over said areas of undesirable vegetation growth and said additional areas of undesirable vegetation growth, wherein said chemical herbicide substance is adapted to eliminate said areas of undesirable vegetation growth and said additional areas of undesirable vegetation growth, wherein said process for eliminating said areas of undesirable vegetation growth and said additional areas of undesirable vegetation growth further comprises mechanically removing from an aerial position, via a rake, a shovel, and a tiller of said control vehicle, said areas of undesirable vegetation growth and said additional areas of undesirable vegetation growth, and wherein said process for eliminating said areas of undesirable vegetation growth and said additional areas of undesirable vegetation growth comprises:

first proceeding to and eliminating a first area of undesirable vegetation growth;

after said first proceeding, second proceeding to and eliminating a second area of undesirable vegetation growth;

after said second proceeding, third proceeding to and eliminating a third area of undesirable vegetation growth;

directing, by said processor after said receiving said first geographical coordinates and said additional geographical coordinates, said vehicle and said additional vehicle to said current location of said control vehicle; and recharging, by said processor via a battery charging station of said control vehicle, said vehicle and said additional vehicle.

* * * * *